R. MORITZ.
ELECTROLYTIC DEVICE FOR GENERATING PURE OXYGEN AND HYDROGEN.
APPLICATION FILED SEPT. 17, 1909.
981,102.
Patented Jan. 10, 1911.
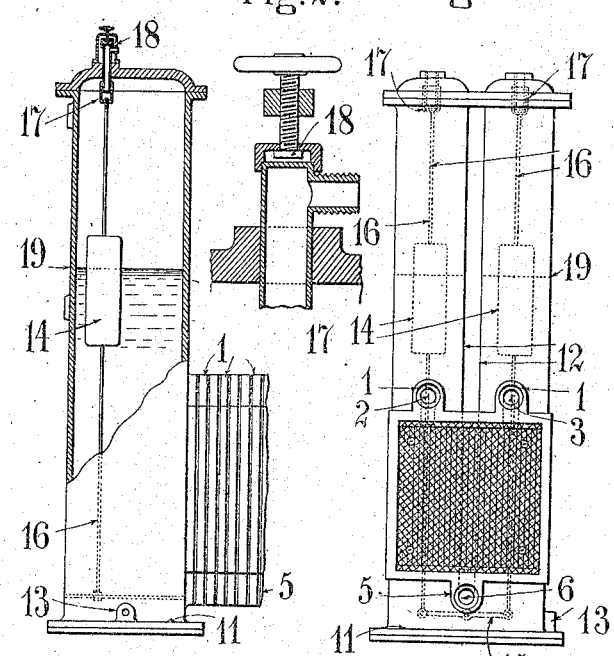
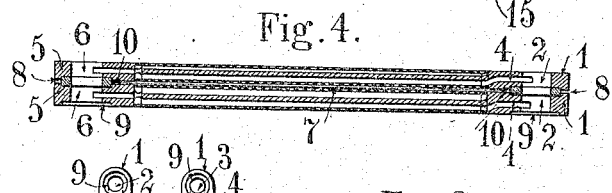
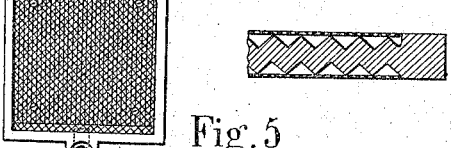
Witnesses:
Inventor:

UNITED STATES PATENT OFFICE.

RENÉ MORITZ, OF WASQUEHAL, FRANCE.

ELECTROLYTIC DEVICE FOR GENERATING PURE OXYGEN AND HYDROGEN.

981,102. Specification of Letters Patent. Patented Jan. 10, 1911.

Application filed September 17, 1909. Serial No. 518,194. REISSUED

*To all whom it may concern:*

Be it known that I, RENÉ MORITZ, a citizen of the Republic of France, residing at Wasquehal, Nord, France, have invented certain new and useful Improvements in Electrolytic Devices for Generating Pure Oxygen and Hydrogen, of which the following is a specification.

In order that an electrolytic device for producing pure oxygen and hydrogen should be practical, it must be complete in itself, there must not be any possibility of oxygen leaking through into the hydrogen compartment and vice versa, even if a joint is not properly made, owing to mistake or carelessness. It is also necessary that the apparatus should not get dirty, even if inadvertently water that is not absolutely clear—as is often the case with rain water—should be used. Finally, for satisfying the present requirements of the industry, the apparatus must deliver the gases at a high pressure, without the purity of the gases being affected thereby.

The apparatus according to this invention is designed so as to fulfil the above conditions.

In the drawing, Figure 1 is a view, partly in section and partly in elevation, of an apparatus embodying my invention. Fig. 2 is a detail sectional view on an enlarged scale, hereinafter referred to. Fig. 3 is a front elevation of the apparatus. Fig. 4 is a sectional view through two of the electrodes. Fig. 5 is an elevation of an electrode. Fig. 6 is a horizontal sectional view, partly broken away, of the electrode seen in Fig. 5.

It comprises electrodes in series, for instance of the type described under the name of cathodes in the French Patent No. 289082 of Eycken, Leroy and Moritz of the 17th May, 1899, Fig. 6, but it is necessary to take special precautions for preventing oxygen produced at one side of the electrode, from becoming mixed, even in a very small quantity, with the hydrogen produced at the other side. To that end, they are provided at the top with two lugs 1 1, Figs. 1, 3, 4 and 5, cast together with the remainder of the electrode. Each of the said lugs is provided with conduits 2 and 3. The conduit 2 is in connection with one side of the electrode through a small passage 4, and the conduit 3 with the other side. At the bottom of the electrode, a third lug 5 is provided with a channel 6 communicating with both sides of the electrode and admitting solution of electrolyte.

By screwing a certain number of electrodes against each other, with interposition of diaphragms 7 (all of asbestos composition) and of another part having the rectangular or square shape of the electrode and by inserting at the point of the conduit or canal elements in the lugs, rubber washers 8 held in place in the recess 9, a series of tight cells will be obtained forming the electrolytic device proper, and three conduits or passages will be obtained in communication: the conduits 2 for hydrogen and the electrolyte on the negative face of the electrode, the conduits 3 for oxygen and the electrolyte on the positive face of the electrode, and the channels 6 for electrolyte for both sides of the electrode. The reason why the canals or conduits in question are not made simply in the form of holes in the rectangular portion of the plate, is that with such an arrangement hydrogen would pass easily into the oxygen and vice versa owing to a bad inner joint, without it being possible to detect it from the outside.

With the arrangement described, if there is a leak, it can only be a leak of oxygen or hydrogen direct into the atmosphere. It will be seen in fact, at 10, that the outer edge of the diaphragm does not touch the rubber washers. In that way all impurity of the gases is avoided, and leaks outward are always visible, for they are accompanied by liquid electrolyte which circulates at the same time as the gases.

In order to prevent solid impurities from collecting between the electrodes and the diaphragms, the first head electrode is hollow and constitutes a tank of large dimensions at the bottom of which sediments can settle at 11. This tank Figs. 1 and 3, is at the same time used as a separator of oxygen and hydrogen. To that end, an airtight partition 12, preferably double, divides it into two parts at the top. In that way a large double vessel is obtained, two branches of which are connected together at the bottom by a very large conduit where the impurities can collect and whence they can be blown out at 13 by means of a drain cock arranged at the lowest point of the tank.

In order to prevent any possibility of a difference of pressure between the compartments of oxygen and hydrogen, it is necessary, when the apparatus supplies its gases at a high pressure, that a device should be used preventing the gases from being generated one more quickly than the other. To that end, in each of the two compartments is arranged a float 14 which partly dips into the liquid, and partly into the gas. These floats are secured each to a rod 16 connected together at the bottom by a pivoted beam 15 arranged in the line of the partition 12. The said rods are provided at the top with balanced tubular or other valves 17 adjustable outside at 18, Fig. 2. When owing to a difference in pressure between the two compartments, the liquid has the tendency to descend at one side in order to rise at the other, the floats follow the movement of the liquid, and the valve also. If, therefore, the pressure in the right hand branch becomes greater than that in the left hand branch, the liquid sinks at the right hand side and rises at the left hand side carrying the floats, the right hand side valve opens, and a great quantity of gas is generated, and the valve on the left hand side is closed and little gas is generated. By suitably regulating these valves, it is possible to obtain any desired pressure in the two reservoirs which can supply the apparatus utilizing high pressure gas, while the gases passing through the valves would be conveyed to the apparatus utilizing low pressure gas. The level of the liquids 19 being always the same in the two reservoirs communicating at the bottom, the pressure on the two sides of the diagrams is the same, and the gases cannot filter through the diaphragm and, therefore, they remain perfectly pure.

What I claim as my invention and desire to secure by Letters Patent is:—

1. In electrolytic apparatus an electrode provided at the top with extensions having each a conduit, and passages placing the conduits in the said extensions in communication with opposite sides of the electrode, and the electrode also having at the bottom an extension provided with a channel in communication with both sides of the electrode.

2. In electrolytic apparatus, electrodes, extensions on said electrodes provided with holes adapted to form canals when the extensions are joined together, means for joining together the extensions independently of the joint between the electrodes, a settling tank containing the electrolyte for the electrodes, and means for draining off impurities from said tank.

3. In electrolytic apparatus, electrodes, extensions on said electrodes provided with holes adapted to form canals when the extensions are joined together, means for connecting one canal to one side of each of the electrodes and another canal to the other side of each of the electrodes respectively, a settling tank containing electrolyte, a partition in said tank adapted to divide it into two compartments, means to connect each of the electrode-extension-canals to one of the compartments, a relief valve and a float in each compartment and means for connecting the valves with the floats for the purpose described.

In testimony whereof I have signed my name to this specification in the presence of two subscribing witnesses.

RENÉ MORITZ.

Witnesses:
 ROBERT SANCAY,
 CHARLES LÈTELLEVER.